United States Patent Office 2,873,297
Patented Feb. 10, 1959

2,873,297

PROCESS OF REACTING OLEFIN OXIDES WITH SPECIFIED ORGANOMAGNESIUM CHLORIDES

Hugh E. Ramsden, Metuchen, N. J., assignor to Metal & Thermit Corporation, New York, N. Y., a corporation of New Jersey No Drawing. Application November 28, 1955
Serial No. 549,570

7 Claims. (Cl. 260—613)

This invention relates to a process of reacting organomagnesium chloride reagents with olefin oxides and to products made by this process. This application is a continuation-in-part of application S. N. 520,152, filed July 5, 1955, now abandoned.

The organomagnesium chloride reagents employed in practicing this invention may be described as $$RMgCl \cdot nQ$$

where R is an aryl group, a vinyl group or a heterocyclic group, as more particularly defined below, $n$ is an indeterminate number from 1 to 3 and Q has a value hereinafter defined. These organomagnesium chloride reagents are made by reacting the corresponding RCl with magnesium in the presence of compound Q as reaction medium. In accordance with this invention, these organomagnesium chloride reagents react with olefin oxides to yield, after further reaction with water or dilute acid, substituted alcohols. These alcohols are useful as intermediates for the manufacture of plasticizers, insecticides, perfumes and other products.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. Permissible substitutions are groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i. e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e. g., above 90° C.) causes great difficulty in carrying out the reaction. Any liquid Q of any structure whatsoever (with the limitations specified hereinbefore) will work.

The compound Q, employed to promote reaction and to form a complex with the vinyl, heterocyclic or aryl magnesium chloride may be a simple 5 or 6 member heterocyclic compound containing one oxygen in the ring and having the requisite characteristics set forth above, e. g., tetrahydrofuran, tetrahydropyran, dihydropyran, etc. It may also be a 5 or 6 member heterocyclic compound containing one oxygen in the ring and further substituted by monovalent groups and having said characteristics, e. g., 2-methyltetrahydrofuran, 2-ethoxytetrahydrofuran, tetrahydrofurfuryl ethyl ether, N-methylmorpholine, etc.

It is an object of the present invention to provide a process for reacting said organomagnesium chlorides with olefin oxides to yield useful products. It is also an object of this invention to provide several new products useful in industry.

The reactions may be carried out in the compound Q, as reaction medium, preferably at a temperature between room temperature and the reflux temperature. However, the temperature is not critical and may be even lower than room temperature. Inert hydrocarbon solvents may be used as the reaction medium in place of the compound Q. When the reaction between the above-mentioned olefin oxides and the organomagnesium chloride reagent is finished, cold water or dilute acid is added carefully and the resulting substituted alcohol is recovered by distillation or otherwise. The sequence of reactions in the case of the olefin oxides is illustrated by the following general equations:

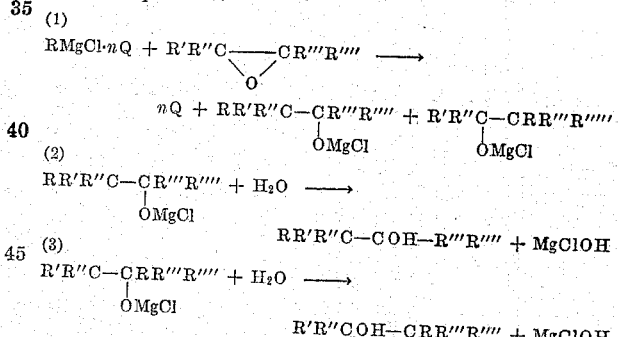

When more than 1 mole of olefin oxide is employed per mole of $RMgCl \cdot nQ$, the reaction produces useful polymeric products in accordance with the following equations:

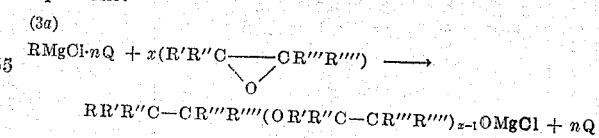

R is chosen from the class of aryl, vinyl or heterocyclic radicals and the broad field embraced by this class is more particularly defined in the discussion and the examples which follow. R', R", R''' and R'''' may be hydrogen or a wide variety of organic radicals as will appear in what follows.

REACTION OF ARYLMAGNESIUM CHLORIDE REAGENTS WITH OLEFIN OXIDES

The reactions of arylmagnesium chloride reagents, $$RMgCl \cdot nQ$$

as defined below, with olefin oxides in accordance with this invention may be illustrated by the following over-all equations, which include the hydrolysis step (Equation 2 above).

(4)
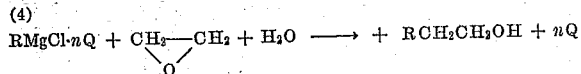

(5)
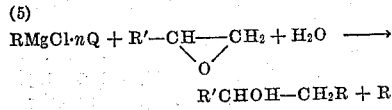

Dehydrating:

(5a)
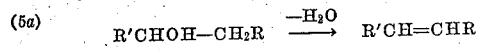

(6)
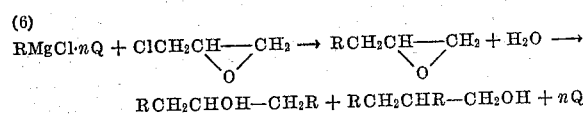

When R is specifically a substituted phenyl, the resulting product may be a substituted phenylethanol, as for instance:

(7)
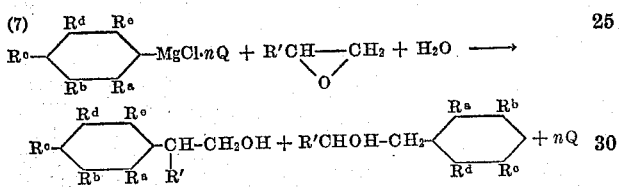

In the above equations, $n$ is a small whole number, R' and R'', R''' and R'''' may be alkyl, aryl, alkenyl, aralkyl and hydrogen, and R is defined as:

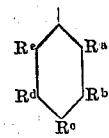

wherein $R^a$, $R^b$, $R^c$, $R^d$ and $R^e$ may be the same or different substituents as long as they do not react with the arylmagnesium chloride reagent. They may be hydrogen; fluorine, chlorine; alkyl, such as methyl, ethyl, etc.; alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxy, such as methoxy, ethoxy, allyloxy, etc.; aryloxy, such as phenoxy, tolyloxy, xenyloxy, etc.; and dialkylamino, such as dimethylamino, diethylamino, etc. groups.

Chlorophenyl and substituted chlorophenylmagnesium chlorides react with olefin oxides according to reactions 1 through 7, wherein R', R'', R''' and R'''' are hydrogen or monovalent organic radicals free of groups reactive to RMgCl, and R is defined in this case as:

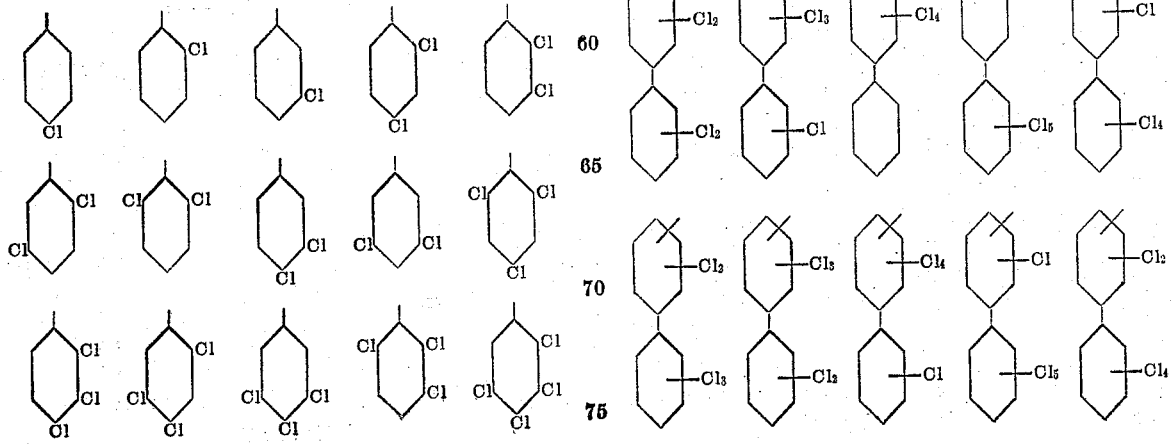

In the above radicals any positions not containing chlorine may be filled with fluorine or any organic monovalent group such as alkyl, alkenyl, aryl, dialkylamino, alkoxy, aryloxy and alkenyloxy groups. In addition, divalent groups such as alkylidene dioxy groups may join to adjacent open ortho positions. The substituents may contain functional groups if these are not reactive to the aryl magnesium chloride reagent.

Xenylmagnesium chlorides will react with olefin oxides according to Reactions 1 through 6, wherein R', R'', R''' and R'''' are the same as defined for those reactions.

R may be defined in these reactions as a xenyl radical, substituted or unsubstituted. The raw materials for preparing the RMgCl by the compound Q process might also contain some chlorinated terphenyls. Thus, R may be:

The bond to the magnesium may be ortho, meta or para. Other groups may be present instead of ring hydrogen, including alkyl, alkenyl, aryl, alkaryl, aralkyl, fluorine, alkoxy, alkenoxy, aryloxy, dialkylamino, etc. groups.

Bifunctional arylene di(magnesium chloride) reagents may also be used with olefin oxides according to the following reactions:

(8)
$$R(MgCl)_2 \cdot nQ + CH_2\text{---}CH_2 + H_2O \rightarrow R(CH_2CH_2OH)_2 + nQ$$
$$\qquad\qquad\qquad\qquad\qquad \diagdown O \diagup$$

(9)
$$nQ \cdot ClMg\text{---}\bigcirc\text{---}MgCl \cdot nQ + CH_2\text{---}CH_2 + H_2O \longrightarrow$$
$$HOCH_2\text{---}CH_2\text{---}\bigcirc\text{---}CH_2\text{---}CH_2OH + nQ$$

(10)
$$R(MgCl)_2 \cdot nQ + R'CH\text{---}CH_2 + H_2O \longrightarrow$$
$$R(R'CHOH\text{---}CH_2\text{---})_2 + R(R'CH\text{---}CH_2OH)_2 + nQ$$

(11)
$$R(MgCl)_2 \cdot nQ + ClCH_2CH\text{---}CH_2 \longrightarrow$$
$$R(\text{---}CH_2CH\text{---}CH_2)_2 \text{ etc.}$$

In the foregoing bifunctional arylene di(magnesium chloride) reactions, R' is the same as previously defined and $R(MgCl)_2$ may be, in general:

where the hydrogens on the ring may be replaced by any group not reactive to RMgCl, such as chlorine, fluorine, $R'_2N\text{---}$, $R'O\text{---}$, $R'$, etc., and where $R'$ is a monovalent organic radical. Two neighboring $R'$ radicals may be cyclicized.

$R(MgCl)_2$ may also be:

where hydrogen may be replaced as above;

where hydrogen may be replaced as above;

where hydrogen may be replaced as above;

where hydrogen may be replaced as above; or R may be any other bivalent group where the bonds from carbon to magnesium are those of aromatic carbon to magnesium, where hydrogen may be replaced as described above.

Furthermore, the number of —MgCl groups attached to R may be more than two. Thus we may have reactions analogous to those described above involving the tri-, tetra-, penta- and hexa- or even higher magnesium chloride derivatives of aryl compounds including such derivatives of chlorinated biphenyls, terphenyls, naphthalenes, etc. For example, such a reagent may be prepared by the following reaction:

(12)

REACTION OF HETEROCYCLIC MAGNESIUM CHLORIDE REAGENTS WITH OLEFIN OXIDES

Heterocyclic magnesium chloride reagents, $RMgCl \cdot nQ$, as defined below, react with olefin oxides generally according to the Reactions 1 through 6, wherein R', R", R''' and R'''' are as previously defined and in which n is a small whole number, Q is as previously defined, and R is a radical which includes in its structure an oxygen, sulfur or tertiary nitrogen heterocycle, its bond to magnesium being through a carbon of an aromatic or pseudoaromatic ring.

Among the types of heterocyclic groups, R, which may be employed in reactions such as Nos. 1–6, are those shown in the following structural formulas in which a free bond indicates the point of attachment of the —MgCl group except that when two free bonds are shown in one structure they represent alternative points of attachment. In these structures any or all hydrogens in the molecules may be replaced by fluorine, chlorine, alkyl, alkenyl, aryl, alkoxy, aryloxy or other groups not reactive to RMgCl. Two adjacent substituents may be linked or cyclized to form further condensed rings.

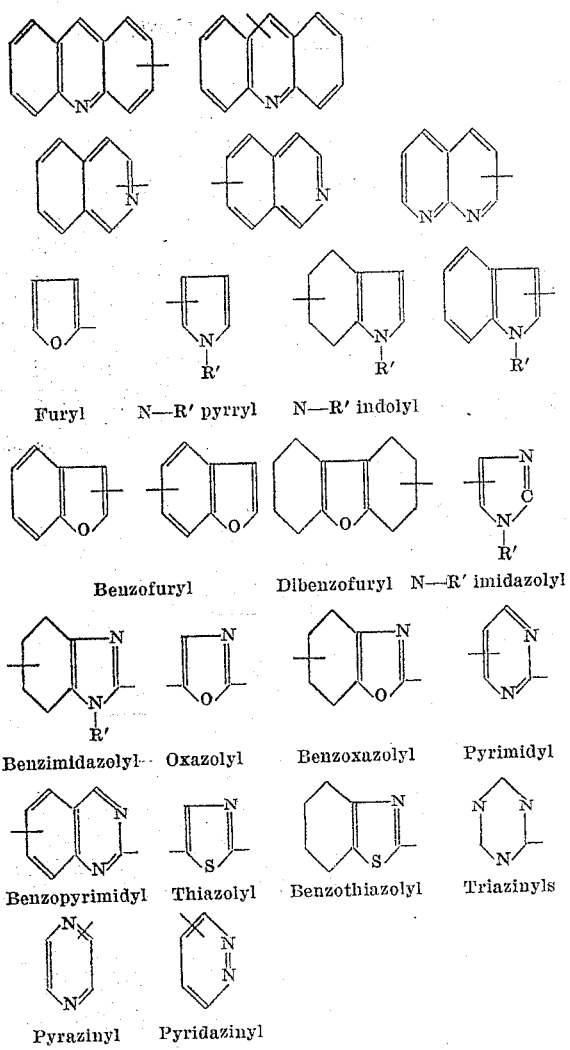

Furyl     N—R' pyrryl     N—R' indolyl

Benzofuryl     Dibenzofuryl     N—R' imidazolyl

Benzimidazolyl     Oxazolyl     Benzoxazolyl     Pyrimidyl

Benzopyrimidyl     Thiazolyl     Benzothiazolyl     Triazinyls

Pyrazinyl     Pyridazinyl

REACTIONS OF VINYL MAGNESIUM CHLORIDE REAGENTS WITH OLEFIN OXIDES

In this application, the term "vinyl" radical refers to the vinyl group or to substituted vinyl groups. Thus, a vinyl chloride has the general formula:

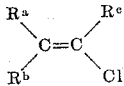

where $R^a$, $R^b$, and $R^c$ may be the same or different and may be hydrogen or any hydrocarbon group, aliphatic or aromatic; they may also be hydrocarbon groups with functional group substituents provided that the latter are inert to magnesium and to vinyl magnesium chloride; $R^a$ may cyclize with $R^b$ or $R^c$ as, for example, in the compound $$CH_2-CH=C-Cl$$
$$|\qquad\qquad|$$
$$CH_2-CH_2-CH_2$$

furthermore, $R^c$ may also be chlorine, in which case the magnesium may react with one or both chlorines.

When the formula $RMgCl \cdot nQ$ is used in this application to refer to a vinyl magnesium chloride, then R represents the group

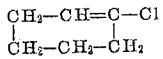

where $R^a$, $R^b$ and $R^c$ are as defined above.

Similarly, in a vinyl dimagnesium chloride reagent, $R(MgCl)_2 \cdot nQ$, R represents the bivalent group

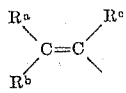

Vinyl magnesium chloride reagents, $RMgCl \cdot nQ$, as defined above, react with olefin oxides in accordance with Equations 1–6, where R', R'', R''' and R'''' have the meanings previously ascribed to them.

More specifically:

(13)
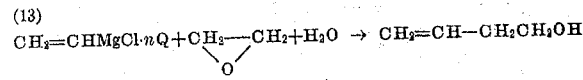

(14)
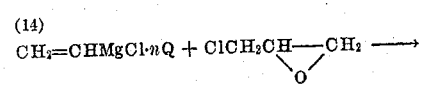

(15)
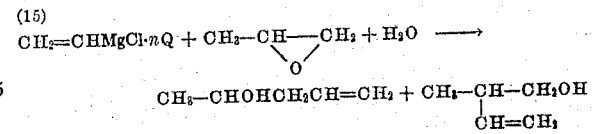

(16)
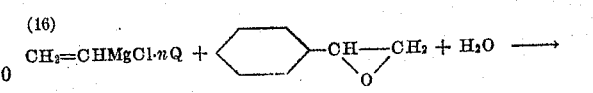
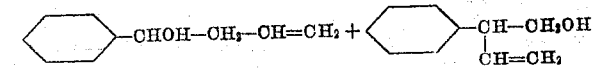

wherein $n$ is defined as above.

Vinyl dimagnesium chloride reagents, $R(MgCl)_2 \cdot nQ$, as defined above, react according to equations 8, 10 and 11.

The following examples are illustrative of the present invention.

*Example 1.—β-Vinylethanol*

One mole of ethylene oxide in 2 moles of tetrahydrofuran was added slowly to one mole of vinylmagnesium chloride in 3 moles of tetrahydrofuran with stirring and cooling. The reaction mixture reached a maximum temperature of 48° C. After addition was completed, the mix was hydrolyzed using one mole of 37% HCl in 250 ml. of water. Gas evolution (ethylene) indicated only a trace of unconverted vinylmagnesium chloride remained. An extra 15 ml. of 37% HCl was necessary to give clean separation of the two layers.

The layers were separated; the aqueous layer was extracted twice with 50 ml. portions of ethyl ether, and the organic layer and the extracts were combined. The ether and tetrahydrofuran were stripped out by distillation at reduced pressure. To the residue were added 50 ml. of a high boiling hydrocarbon as a chaser and the product was distilled over. A fraction (80 ml.) of product was redistilled at atmospheric pressure yielding 68 grams of product (94% of theory) of which 23.9 grams (33%) were in the boiling range of 3 buten-1-ol.

*Example 2.—$CH_2=CHCH_2CH_2(OCH_2CH_2)_xOH$*

A solution of 3.25 moles of ethylene oxide, in 6.0 moles of tetrahydrofuran was prepared. This solution was added slowly, with stirring, to a previously prepared solution of 0.5 mole of vinylmagnesium chloride-tetrahydrofuran-complex in tetrahydrofuran. Reaction caused the pot temperature to rise to 66° C. maximum at the point when 210 ml. of original 650 ml. solution was in. Then a slow decrease in temperature began. A heating mantle was now turned on low.

As solution addition continued, the viscosity continually increased and the very slow temperature drop continued. When the addition of the original 650 ml. solution was complete, the reaction mixture was a solid, easily broken up by the stirrer but tending, on standing, to compact together to a single solid mass.

An additional 1.69 moles of ethylene oxide were dissolved in 3.0 moles tetrahydrofuran. With the stirrer and the heating mantle turned on, addition of this solution was begun. After 133 gm. of a total 290 gm. of solution were in, the viscosity had reached the point where the stirrer would no longer function. The addition was discontinued.

At this point the material was easily broken up into lumps and through it appeared to be a dry solid, on standing it took on its glassy look.

The flask was emptied by inverting it over a beaker for several days. Material turned into a red-orange dry powder in the beaker. It was hydrolyzed by adding 0.5 mole 37% HCl/100 ml. $H_2O$ to it. This resulted in a reddish liquid and a gelatinous solid which was suction filtered at an extremely slow rate. The product, $CH_2=CHCH_2(OCH_2CH_2)_xOH$, was a plum-colored, sticky material resembling chewing gum.

Example 3.—2-methyl-3-buten-1-ol

One mole of propylene oxide in one mole of tetrahydrofuran was slowly added to 1.0 mole of vinylmagnesium chloride in 3 moles of tetrahydrofuran with stirring and cooling of the reaction flask. After completion of the addition, the mix was hydrolyzed using one mole+35 ml. of 37% hydrochloric acid in 250 ml. of water, the layers separated, the aqueous layer extracted with ether, and the extracts combined with the organic layer.

The organic layer was stripped of ether and tetrahydrofuran by distillation at atmospheric pressure. In order to remove the last traces of solvents the residue was distilled under reduced pressure and was finally fractionally distilled under vacuum to yield 43% of theory of 2 methyl-3-buten-1-ol B. P. at 63 mm. 60° C. and ref. index 1.4300. At atmospheric pressure, it boiled at 122° C.

Example 4.—β-Phenylethanol

One mole of ethylene oxide dissolved in tetrahydrofuran (one mole) was added slowly to phenylmagnesium chloride in tetrahydrofuran (3 moles) with stirring and cooling (maximum temperature about 50° C). After addition was completed, external heating to reflux was applied and continued until the mix became a grey slurry. (If heating is discontinued before this point, the entire mix will gel to a heavy solid mass which is difficult to handle.) Heating was continued for one hour longer, the mixture cooled, and one mole (+10 ml.) of 37% HCl in 250 ml. $H_2O$ was added for hydrolysis. The layers were separated and two ethyl ether extracts of the aqueous layer were combined with the organic layer.

The organic layer was stripped of solvents and β-phenylethanol was recovered by vacuum distillation. A yield of 93% based on the phenylmagnesium chloride resulted.

Example 5.—β-2 thienylethanol

α-Thienylmagnesium chloride by the process of Example 4 yielded a 71% yield of β-2 thienylethanol.

Example 6.—3-vinylbutanol-2

One mole of vinylmagnesium chloride in 3 moles of tetrahydrofuran reacts with one mole of 2,3-butylene oxide to form 3-vinylbutanol-2 by the process of Example 4.

Example 7.—β,β-Divinylethanol

Vinylmagnesium chloride and tetrahydropyran in place of tetrahydrofuran and vinylethylene oxide react by the process of Example 4 to form β,β-divinylethanol.

Example 8.—β-Phenyl-β-vinylethanol

Vinylmagnesium chloride and methyltetrahydrofuran in place of tetrahydrofuran and styrene oxide yield β-phenyl-β-vinylethanol by the process of Example 4.

Example 9.—Phenylethoxyethoxyethoxyethoxyethoxyethanol

Seven moles of ethylene oxide added to phenylmagnesium chloride (one mole) by a process of Example 2 yield phenyl (ethoxy)₆-ethanol, a material with wetting agent properties.

Example 10.—β-Methyl-β-phenylethanol

Phenylmagnesium chloride and propylene oxide by the process of Example 4 yield β-methyl-β-phenylethanol.

Example 11.—3-phenylbutanol-2

Phenylmagnesium chloride and 2,3 butylene oxide by the process of Example 4 yield 3-phenylbutanol-2.

Example 12.—β-Phenyl-β-vinylethanol

Phenylmagnesium chloride and vinylethylene oxide by the process of Example 4 yield β-phenyl-β-vinylethanol.

Example 13.—β,β-diphenylethanol

Phenylmagnesium chloride and styrene oxide by the process of Example 4 yield β,β-diphenylethanol.

Example 14.—β-p-Chlorophenylethanol p-Chlorophenylmagnesium chloride and ethylene oxide by the process of Example 4 yield β-p-chlorophenylethanol.

Example 15.—p-Chlorophenylethoxyethoxyethanol

Three moles of ethylene oxide added to one mole of p-chloro-phenylmagnesium chloride by the process of Example 2 yields p-chlorophenylethoxyethoxyethanol.

Example 16.—β-p-Chlorophenyl-n-propanol p-Chlorophenylmagnesium chloride and propylene oxide by the process of Example 4 yield β-p-chlorophenyl-n-propanol.

Example 17.—3-p-chlorophenylbutanol-2 p-Chlorophenylmagnesium chloride and 2,3 butylene oxide yield 3-p-chlorophenylbutanol-2 by the process of Example 4.

Example 18.—β Vinyl-β-p-chlorophenylethanol p-Chlorophenylmagnesium chloride and vinylethylene oxide yield β vinyl-β-p-chlorophenylethanol when used in the process of Example 4.

Example 19.—β Phenyl-β-p-chlorophenylethanol p-Chlorophenylmagnesium chloride and styrene oxide in the process of Example 4 yield β-phenyl-β-p-chlorophenylethanol.

Example 20.—β-o-Tolylethanol

Ethylene oxide and o-tolylmagnesium chloride used in the process of Example 4 yield β-o-tolylethanol.

Example 21.—3-o-tolylbutanol-2

Used in the process of Example 4, 2,3-butylene oxide and o-tolylmagnesium chloride yield 3-o-tolylbutanol-2.

Example 22.—2-m-tolylpropanol-1

Propylene oxide and m-tolylmagnesium chloride in the process of Example 4 yield 2-m-tolylpropanol-1.

Example 23.—β Phenyl-β-m-tolylethanol

Styrene oxide and m-tolylmagnesium chloride by the process of Example 4 yield β phenyl-β-m-tolylethanol.

Example 24.—p-Tolyl (ethoxy)₆ ethanol

By the process of Example 2, 7 moles of ethylene oxide and one mole of p-tolylmagnesium chloride yield p-tolyl (ethoxy)₆ ethanol.

Example 25.—β-p-Tolyl-β-vinylethanol

Vinylethylene oxide and p-tolylmagnesium chloride yield β-p-tolyl-β-vinylethanol by the process of Example 4.

Example 26.—β-p-Anisylethanol

Ethylene oxide and p-anisylmagnesium chloride yield β-p-anisylethanol by the process of Example 4.

Example 27.—Mono-β-p-anisylethyl ether of octaethylene glycol

Nine moles of ethylene oxide and one mole of p-anisylmagnesium chloride by the process of Example 2 yield mono-β-p-anisylethyl ether of octaethylene glycol, a wetting agent.

Example 28.—2-p-phenetylpropanol-1

Propylene oxide and p-phenetylmagnesium chloride yield, by the process of Example 4, 2-p-phenetylpropanol-1.

Example 29.—3-p-phenetylbutanol-2

Butylene oxide (2,3) and p-phenetylmagnesium chloride yield 3-p-phenetylbutanol-2 by the process of Example 4.

Example 30.—Mono-β-polychlorophenylethyl ethers of hexaethylene glycol

By the process of Example 2, seven moles of ethylene oxide and one mole quantities of 2,5 dichlorophenylmagnesium chloride, 2,4,5 trichlorophenylmagnesium chloride, tetrachlorophenylmagnesium chloride, and pentachlorophenylmagnesium chloride yield respectively the 2,5 dichlorophenylethyl, 2,4,5 trichlorophenylethyl, tetrachlorophenylethyl, and pentachlorophenylethyl monoethers of hexaethylene glycol.

Example 31.—β-2-m-xylylethanol

Reaction of m-xylyl-2-magnesium chloride and ethylene oxide by the process of Example 4 yields β(2-m-xylyl) ethanol.

Example 32.—β-Vinyl-β-2-m-xylylethanol

Vinylethylene oxide and m-xylyl-2-magnesium chloride by the process of Example 4 yield β vinyl-β-2-m-xylylethanol.

Example 33.—Biphenylylethanol

Biphenylylmagnesium chloride and ethylene oxide by the process of Example 4 yield biphenylylethanol.

Example 34.—Trichlorobiphenylylethyl and nonachlorobiphenylylethyl ethers of penta-ethylene glycol Reaction of 6 moles of ethylene oxide by the process of Example 2 with trichlorobiphenylylmagnesium chloride and nonachlorobiphenylylmagnesium chloride yields respectively the trichlorobiphenylylethyl and nonachlorobiphenylylethyl ethers of penta-ethylene glycol.

Example 35.—α-Naphthylethanol

α-Naphthylmagnesium chloride and ethylene oxide under the conditions of Example 4 yield α-naphthylethanol.

Example 36.—β-Vinyl β-o-trifluoromethylphenylethanol

Vinylethylene oxide and o-trifluoromethylphenylmagnesium chloride yield β-vinyl-β-o-trifluoromethylphenylethanol by the process of Example 4.

Example 37.—β-p-Dimethylaminophenylethanol

Ethylene oxide and p-dimethylaminophenylmagnesium chloride under the conditions of Example 4 yield β-p-dimethylaminophenylethanol; however, it is necessary after the hydrolysis step to add aqueous sodium bicarbonate to form a neutral solution before separating the layers. Since some precipitate forms, the organic layer+extract must be filtered before the stripping steps.

Example 38.—β-p-Dimethylaminophenyl ethyl mono ether of hexaethylene glycol

Seven moles of ethylene oxide and one mole of p-dimethylaminophenylmagnesium chloride under the conditions of Example 2 yield β-p-dimethylaminophenylethyl mono ether of hexaethylene glycol. No more than theoretical HCl should be used in the hydrolysis step.

Example 39.—β-Vinyl-β-p-dimethylaminophenylethanol

Vinylethylene oxide (butadiene monoxide) and p-dimethylaminophenylmagnesium chloride by the process of Example 37 yield β-vinyl-β-p-dimethylaminophenylethanol.

Example 40.—β-p-Diethylaminophenylethanol p-Diethylaminophenylmagnesium chloride by the process of Example 37 yield β-p-diethylaminophenylethanol.

Example 41.—β-p-Diethylaminophenyl ethyl mono ether of hexaethylene glycol

By the process of Example 38 p-diethylaminophenylmagnesium chloride yields β-p-diethylaminophenyl ethyl mono ether of hexaethylene glycol.

Example 42.—β-Vinyl-β-p-diethylaminophenylethanol

By the process of Example 39 p-diethylaminophenylmagnesium chloride yields β-vinyl-β-p-diethylaminophenylethanol.

Example 43.—β-Chlorotolylethanol

4(2)-chloro-2 (4) tolylmagnesium chloride by the process of Example 4 yields β-4 (2)-chloro-2 (4) tolylethanol.

Example 44.—β-Phenyl-β-chlorotolylethanol

Chlorotolylmagnesium chloride by the process of Example 13 yields β-phenyl-β-chlorotolylethanol.

Example 45.—β-Chloroanisylpropanol-1

Chloroanisylmagnesium chloride in the process of Example 3 yields β-chloroanisylpropanol-1.

Example 46.—3-chloroanisylbutanol-2

By the process of Example 11 chloroanisylmagnesium chloride yields 3-chloroanisylbutanol-1.

Example 47.—β-Chlorophenetylethanol

Chlorophenetylmagnesium chloride by the process of Example 4 yields β-chlorophenetylethanol.

Example 48.—β-Ethyltetrachlorophenylethanol

Ethyltetrachlorophenylmagnesium chloride by the process of Example 4 yields β-ethyltetrachlorophenylethanol.

Example 49.—β-α-Thienyl ethyl mono ether of hexaethylene glycol

By the process of Example 9 α-thienylmagnesium chloride yield β-α-thienyl ethyl mono ether of hexaethylene glycol.

Example 50.—β-Vinyl-β-α-thienylethanol

By the process of Example 7 α-thienylmagnesium chloride yields β-vinyl-β-α-thienylethanol.

Example 51.—β-Phenyl-β-α-thienylethanol

By the process of Example 8 α-thienylmagnesium chloride yields β-phenyl-β-α-thienylethanol.

Example 52.—β-2 pyridylethanol

By the process of Example 37, 2-pyridylmagnesium chloride yields β-2 pyridylethanol.

Example 53.—β-Vinyl-β-2 pyridylethanol

By the process of Example 37 vinylethylene oxide and 2-pyridylmagnesium chloride yield β-vinyl-β-2 pyridylethanol.

Example 54.—β-Phenyl-β-2- pyridylethanol

By the process of Example 37, styrene oxide and 2-pyridylmagnesium chloride yield β-phenyl-β-2 pyridylethanol.

Example 55.—β-2 furylethanol

By the process of Example 4, 2-furylmagnesium chloride yields β-2 furylethanol.

Example 56.—2-5-chloro-2-thienylpropanol-1

By the process of Example 4, 5-chloro-2-thienylmagnesium chloride and propylene oxide yield 2-5-chloro-2-thienylpropanol-1.

Example 57.—β-m-Fluorophenylethanol

By the process of Example 4, m-fluorophenylmagnesium chloride yields β-m-fluorophenylethanol.

Example 58.—β-Polyfluorophenylethanols

By the process of Example 4, difluorophenyl, trifluorophenyl, tetrafluorophenyl, and pentafluorophenylmagnesium chlorides yield respectively β-difluorophenylethanol, β-trifluorophenylethanol, β-tetrafluorophenylethanol, and β-pentafluorophenylethanol.

Example 59.—β-2-benzothiazolylethanol

By the process of Example 37, 2-benzothiazolylmagnesium chloride yields β-2-benzothiazolylethanol.

Example 60.—β-2-benzoxazolylethanol

By the process of Example 37, 2-benzoxazolylmagnesium chloride yields β-2-benzoxazolylethanol.

Example 61.—β-2-methyl-5-benzothiazolylethanol

By the process of Example 37, 2-methyl-5-benzothiazolylmagnesium chloride yields β-2-methyl-5-benzothiazolylethanol.

Example 62.—β-2-quinolylethanol

By the process of Example 37, 2-quinolylmagnesium chloride yields β-2-quinolylethanol.

Example 63.—2-(6-quinolyl) propanol-1

By the process of Example 37, 6-quinolylmagnesium chloride and propylene oxide yield 2(6-quinolyl) propanol-1.

Example 64.—β-Phenyl-β-8-quinolylethanol

By the process of Example 37, 8-quinolylmagnesium chloride and styrene oxide yield β-phenyl-β-8-quinolylethanol. The process is modified by recrystallizing the product from benzene rather than by distillation.

Example 65.—β-(4,5,6 trichloro-2-pyrimidyl) ethanol

By the process of Example 37, 4,5,6 trichloro-2-pyrimidylmagnesium chloride yields β-(4,5,6 trichloro-2-pyrimidyl) ethanol.

Example 66.—β-1-cyclohexen-1-ylethanol

By the process of Example 4, 1 cyclohexen-1-ylmagnesium chloride yields β-1-cyclohexen-1-ylethanol.

Example 67.—β-4-methylpent-1-en-2-ylethanol

By the process of Example 4, 4-methylpent-1-en-2-yl-magnesium chloride yields 5-methyl - 3 - methylene-hexanol-1.

Example 68.—β-2-propen-2 ylethanol

By the process of Example 4, 2 propen-2-ylmagnesium chloride yields β-2 propen-2 ylethanol.

Example 69.—β-Vinyl-β-2 propen-2-ylethanol

By the process of Example 4, vinylethylene oxide and 2 propen-2 ylmagnesium chloride yield β-vinyl-β-2-propen-2-ylethanol.

Example 70.—β-Phenyl-β-2 propen-2-ylethanol

Styrene oxide and 2-propen-2-ylmagnesium chloride, by the process of Example 4, yield β-phenyl-β-2-propen-2-ylethanol.

Example 71.—β-2-buten-2-ylethanol

By the process of Example 4, 2-buten-2-ylmagnesium chloride yields β-2-buten-2-ylethanol.

Example 72.—3-hexanol-1

By the process of Example 4, 1 butenyl-1-ylmagnesium chloride yields 3 hexanol-1.

Example 73.—4-methyl-3 pentenol-1

By the process of Example 4, 2-methyl-2-propen-1 ylmagnesium chloride yields 4-methyl-3-pentenol-1.

Example 74.—β-2-N-methylpyrrylethanol

By the process of Example 4, 2-N-methylpyrryl-magnesium chloride yields β-2-N-methylpyrrylethanol.

Example 75.—β-4-vinylphenylethanol

By the process of Example 4, 4-vinylphenylmagnesium chloride yields β-4-vinylphenylethanol.

Throughout the application it is specified that the reactive compound is RMgCl·$n$Q. This is so in the equations illustrative of the process and of the materials used in the examples. It is necessary that the RMgCl compound be formed in the presence of compound Q. However, the process of the present invention is not dependent upon RMgCl being present in the form of the Q complex (RMgCl·$n$Q). The illustrative equations herein may also be written with RMgCl in place of RMgCl·$n$Q and could be read with RMgCl as an alternative reactant to RMgCl·$n$Q.

The processes of the present invention are useful in the preparation of many compounds which find use in industry.

Substituted (other than halogen substituted) phenylethanols are perfume ingredients having characteristic notes. Phenylethanol itself has a rose note.

All of the alcohols may be reacted with organic acids to yield esters, some of which are perfume oils, some are plasticizers and some, i. e., those having vinyl groups being polymerization monomers and comonomers and cross-linking agents.

The vinyl alcohols of aliphatic nature have characteristic odors useful in perfumes.

Those alcohols having high chlorine content are useful as insecticides and fungicides as well, also as intermediates for fire-proofing ester plasticizers.

Those alcohols having a multiplicity of olefin oxide residues, [R—C—C—O(C—C—O)$n$—H], are wetting agents and have detergent properties. In addition, those having R′$_2$N groups may have these groups converted by use of R′Br to (R′$_3$N)+(Br)−, a quaternary ammonium group which confers germicidal properties in addition to the wetting agent properties.

The vinyl types (Vi(CH$_2$CH$_2$O)$n$H for example) may be polymerized or copolymerized through the vinyl group to give compounds having gelling properties and used in latex paints for bodying the usually thin latex to improve brushing character.

There has been described what is believed to be the best embodiments of this invention. It is not wished, however, to be confined to the specific embodiments shown. Many modifications of these embodiments may be made by one skilled in the art without departing from the spirit of this invention.

What is claimed is:

1. A process which comprises reacting at between room temperature and reflux temperature an ethylenic oxide selected from the class consisting of ethylene oxide, propylene oxide, vinylethylene oxide, styrene oxide and 2,3-butylene oxide with an organomagnesium chloride in the presence of compound Q; said organomagnesium chloride being prepared by reacting an organic chloride of the formula RCl, wherein R is selected from the class consisting of aryl, vinyl and aromatic-heterocyclic radicals, with magnesium in compound Q; wherein said compound Q is selected from the class consisting of tetrahydrofuran, tetrahydropyran, 2-ethoxytetrahydropyran, dihydropyran, tetrahydrofurfuryl ethyl ether and 2-methyl tetrahydrofuran; and wherein said aromatic-heterocyclic radical is selected from the class consisting of α-thienyl, 5-chloro-2-thienyl, 2-pyridyl, 2-furyl, 2-benzothiazolyl, 2-benzoxazolyl, 2-methyl-5-benzothiazolyl, 2-quinolyl, 6-quinolyl, 8-quinolyl, 4,5,6-trichloro-2-pyrimidyl and 2-N-methylpyrryl.

2. The process according to claim 1 in which an excess of said ethylenic oxide is used for every mole of said organomagnesium chloride.

3. The process according to claim 1 in which Q is tetrahydrofuran.

4. The process according to claim 1 in which R is the phenyl radical.

5. The process according to claim 1 in which R is the tolyl radical.

6. The process according to claim 1 in which R is the anisyl radical.

7. The process according to claim 2 in which R is the vinyl radical.

References Cited in the file of this patent

Feiser et al.: Org. Chem., Reinhold Publ. Co., 1950, page 135.

Kharasch: "Grignard Reactions of Non Metallic Substances," 1954, pp. 982, 961–1012, 1031.

Helvetica Chim. Acta, vol. 26, 1943, pp. 2251–52.